Sept. 16, 1941.  R. A. BAUDRY  2,255,910
BLOWER FOR FIELD COIL.
Filed Nov. 24, 1937  2 Sheets—Sheet 1

WITNESSES:
E. F. Oberheim.
F. P. Lyle

INVENTOR
René A. Baudry.
BY O. B. Buchanan
ATTORNEY

Patented Sept. 16, 1941

2,255,910

UNITED STATES PATENT OFFICE 2,255,910

BLOWER FOR FIELD COILS

René A. Baudry, Pittsburgh, Pa., assignor to Westinghouse Electric & Manufacturing Company, East Pittsburgh, Pa., a corporation of Pennsylvania Application November 24, 1937, Serial No. 176,266

6 Claims. (Cl. 171—252)

This invention relates to the cooling and ventilation of dynamo-electric machines and, more specifically, to a blower for mounting on the rotors of large salient pole machines, such as synchronous motors.

In such machines, the rotating member or rotor is usually the field structure and it is customary to mount a fan or blower on the shaft to force air into the machine to cool it. In salient pole machines, the rotor has pole pieces secured to it with field windings on them and the ends of the field windings are usually provided with fins to assist in dissipating the heat generated in these windings. The rate at which this heat is dissipated depends to a large extent on the velocity of the air passing over the fins. With the ordinary type of blower having radial blades placed parallel to the axis, the velocity of the air drawn into the machine by the blower relative to the field coils is practically zero, since both are rotating together at the same speed. Even when the fan blades are curved or are placed at an angle to the axis of rotation, the relative velocity of the air with respect to the field windings is very low, and these windings are not cooled as effectively as other parts of the machine.

The object of the present invention, therefore, is to improve the cooling of the field windings of large salient pole machines.

Another object is to provide a special blower to be mounted on the rotor of a salient pole machine which will direct a high velocity flow of air over the field windings.

The new blower is of the centrifugal type and consists essentially of inner and outer shroud rings having radially curved blades mounted between them which force air into the machine in the usual manner. The inner shroud ring is formed with openings adjacent to the blades and deflector members adjacent the openings. Air drawn in by the blower is discharged through these openings and flows between the blower and the field windings at high velocity. The deflectors serve to direct a part of the flow of air between the pole pieces.

The invention will be more fully understood from the following description taken in connection with the accompanying drawings, in which.

Figure 1:
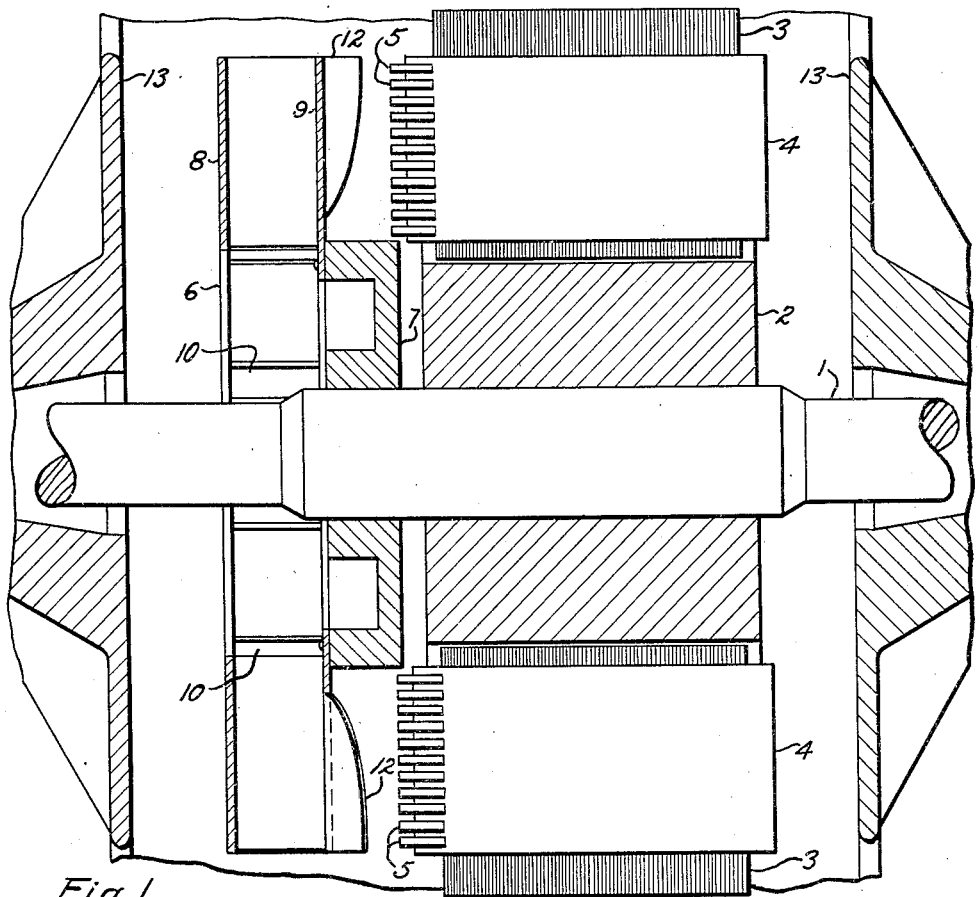
Figure 1 is a longitudinal section through the rotor of a salient pole synchronous motor.
Figure 2:
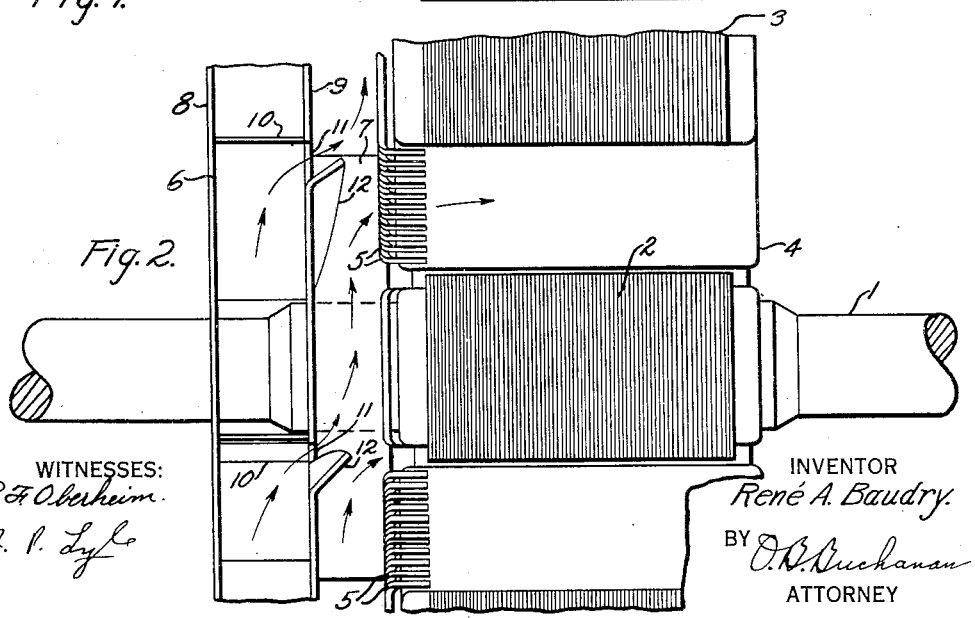
Fig. 2 is a plan view of the rotor shown in Fig. 1.

The blower, as shown in the drawings, is adapted to be mounted on the shaft 1 of a rotating field member having a core 2 and a plurality of salient pole pieces 3. Field windings 4 are provided on the pole pieces and have fins 5 on one or both of the ends thereof to assist in dissipating the heat generated in these windings. The blower is indicated generally at 6 and has a hub portion 7 which is keyed or otherwise secured to the shaft 1. The blower proper is mounted on the hub portion and is of the centrifugal type consisting of an outer shroud ring 8 and an inner shroud ring 9 with a plurality of curved blades 10 secured between them. Openings 11 are formed in the inner shroud ring adjacent each blade and deflector members 12 are provided adjacent each opening. It will be seen from Figs. 1 and 2 that the blower is mounted close to one end of the pole pieces so as to form a circumferential passageway or duct between the inner shroud ring and the ends of the pole pieces. The stator member of the machine is indicated at 13 and is provided with the usual core and windings which may be of any desired construction.

Figure 3:
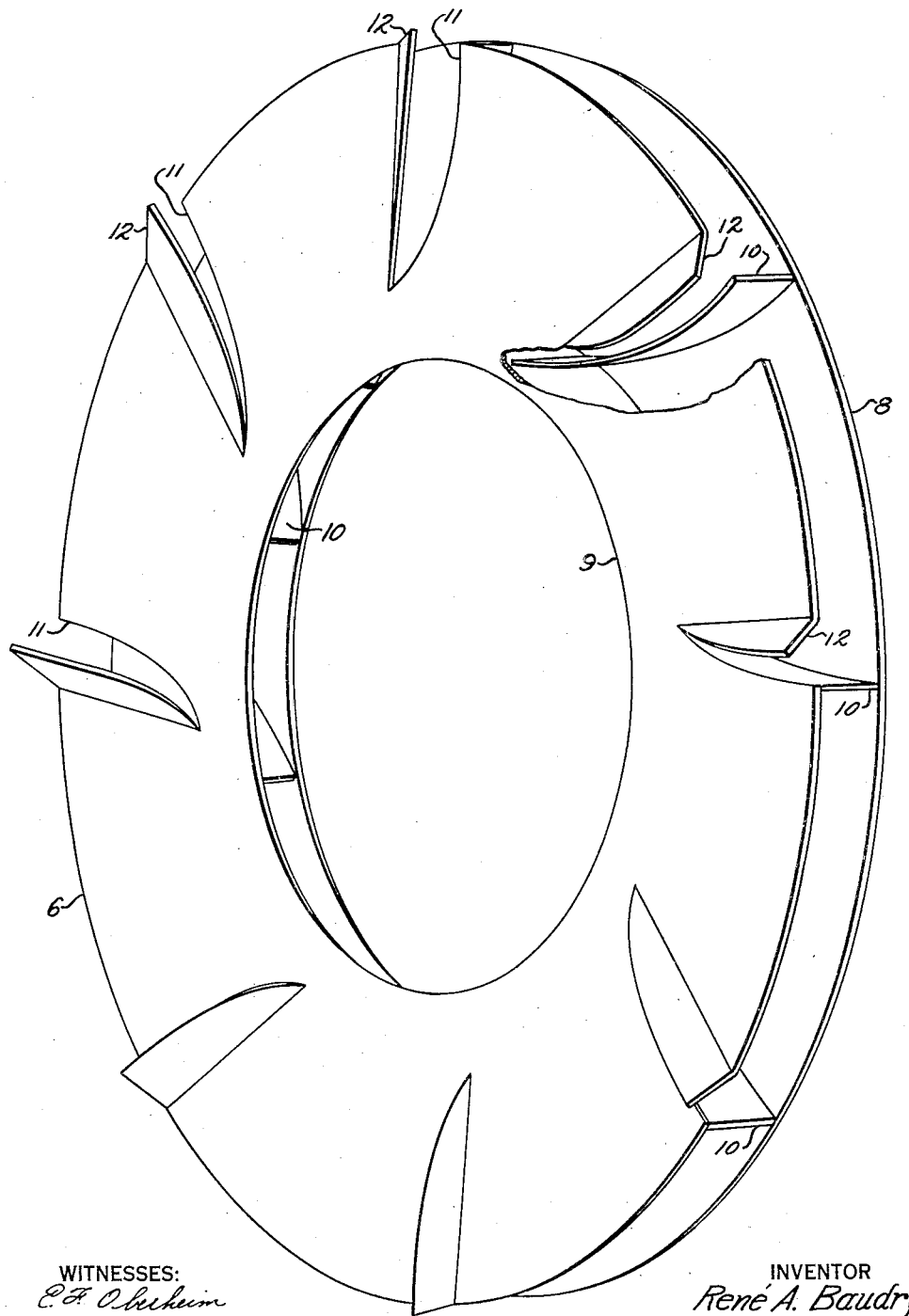
Fig. 3 is a perspective view of the blower looking towards its inner side.

In operation, the blower rotates with the rotor in a counter-clockwise direction as viewed in Fig. 3 and draws air into the machine by the action of the blades 10. A large part of this air is discharged through the openings 11 and, therefore, circulates through the duct formed between the blower and pole pieces at high velocity relative to the field windings. The deflectors 12 serve to direct part of this flow of air into the spaces between the pole pieces as shown by the arrows in Fig. 2. A high velocity flow of air is thus provided over the fins on the ends of the field windings and around the windings themselves which very effectively cools them. Some of the air drawn in by the blower will, of course, be discharged at its outer periphery and will pass over the stator windings and other parts of the machine in the same manner as the air forced into a machine by a conventional blower. The air discharged through the openings 11, after passing over the field windings, will also pass over other parts of the machine and have a cooling effect on them.

It will be seen, therefore, that a blower has been provided which greatly improves the ventilation of the field windings of salient pole machines, as compared with prior practice, by causing a high velocity flow of air across these windings, while at the same time sufficient air is drawn into the machine to cool its other parts as effectively as with a conventional blower.

Although a specific embodiment of the invention has been described, it is not limited to this construction, but in its broadest aspect, it includes all equivalent embodiments which fall within the scope of the appended claims.

I claim as my invention:

1. In a dynamo-electric machine, a rotor member having a plurality of salient pole pieces thereon, a blower mounted on the rotor member adjacent the ends of said pole pieces for forcing a ventilating gas through the machine, said blower having annular shroud rings and a plurality of generally radial blades secured between the shroud rings to discharge the gas radially through the peripheral opening between the rings, the shroud ring closest to said pole pieces having a plurality of openings at its outer periphery through which the ventilating gas is discharged into the space between the blower and the pole pieces at relatively high velocity with respect to the pole pieces, and deflector elements on said shroud ring adjacent each of the openings and arranged to direct the gas discharged through the openings to cause it to flow circumferentially in the space between the blower and the pole pieces and axially between the pole pieces.

2. In a dynamo-electric machine, a rotor member having a plurality of salient pole pieces thereon, a blower mounted on the rotor member adjacent the ends of said pole pieces for forcing a ventilating gas through the machine, said blower having annular shroud rings and a plurality of generally radial blades secured between the shroud rings to discharge the gas radially through the peripheral opening between the rings, the shroud ring closest to said pole pieces having openings therein extending to its outer periphery adjacent each of said blades through which the gas is discharged into the space between the blower and the pole pieces at relatively high velocity with respect to the pole pieces, and deflector elements on said shroud ring adjacent each of said openings, said deflector elements extending angularly from the shroud ring and being arranged to direct the gas discharged through the openings to cause it to flow circumferentially in the space between the blower and the pole pieces and axially between the pole pieces.

3. A blower for a dynamo-electric machine comprising axially spaced annular shroud rings, a plurality of generally radial blades secured between the shroud rings, the space between the outer peripheries of the shroud rings being open to permit radial discharge of the gas passing through the blower, one of said shroud rings having a plurality of separate openings therein at its outer periphery, said openings extending generally radially and being positioned adjacent the blades, whereby part of the gas is discharged through said openings at a different velocity from the gas discharged at the outer periphery of the blower, and a plurality of deflector elements on said shroud ring disposed to direct the gas discharged through said openings into a desired direction of flow.

4. A blower for a dynamo-electric machine comprising axially spaced annular shroud rings, a plurality of generally radial blades secured between the shroud rings, the space between the outer peripheries of the shroud rings being open to permit radial discharge of the gas passing through the blower, one of said shroud rings having a plurality of separate openings therein at its outer periphery, said openings extending generally radially and being positioned adjacent the blades, whereby part of the gas is discharged through said openings at a different velocity from the gas discharged at the outer periphery of the blower, and a plurality of deflector elements on said shroud ring, said deflector elements being disposed adjacent said openings to direct the gas discharged through the openings into a desired direction of flow.

5. A blower for a dynamo-electric machine comprising axially spaced annular shroud rings, a plurality of generally radial blades secured between the shroud rings, the space between the outer peripheries of the shroud rings being open to permit radial discharge of the gas passing through the blower, one of said shroud rings having a plurality of separate openings therein at its outer periphery, said openings extending generally radially and being positioned adjacent the blades, whereby part of the gas is discharged through said openings at a different velocity from the gas discharged at the outer periphery of the blower, and a plurality of deflector elements on said shroud ring, said deflector elements being disposed at the edges of said openings and extending angularly from the shroud ring to direct the gas discharged through said openings into a desired direction of flow.

6. A blower for a dynamo-electric machine comprising axially spaced annular shroud rings, a plurality of generally radial blades secured between the shroud rings, the space between the outer peripheries of the shroud rings being open to permit radial discharge of the gas passing through the blower, one of said shroud rings having a plurality of separate openings therein at its outer periphery, said openings extending generally radially and being positioned adjacent the blades, whereby part of the gas is discharged through said openings at a different velocity from the gas discharged at the outer periphery of the blower, and portions of said shroud ring adjacent said openings extending at an angle to the plane of the shroud ring to direct the gas discharged through the openings into a desired direction of flow.

RENÉ A. BAUDRY.